United States Patent Office 2,708,210
Patented May 10, 1955

2,708,210

DEHYDROHALOGENATION PROCESS AND CATALYST

Roy C. Sias, Independence, Kans., assignor to Continental Oil Company, Ponca City, Okla., a corporation of Delaware No Drawing. Application July 23, 1952, Serial No. 300,517

5 Claims. (Cl. 260—677)

This invention relates to the catalytic dehydrohalogenation of halogenated high molecular weight aliphatic hydrocarbons. More particularly, it relates to contact materials for use in catalytic dehydrohalogenation processes and a method of activating such contact materials for improved dehydrohalogenation.

Halogenation followed by subsequent dehydrohalogenation is a usual procedure in the production of high molecular weight olefinic hydrocarbons from high molecular weight paraffinic hydrocarbons. Ordinarily such paraffinic hydrocarbons are paraffin waxes which are a product of petroleum refining processes. These waxes are usually halogenated by direct chlorination and are then dehydrochlorinated by heating at elevated temperatures. Hydrogen chloride gas is evolved producing unsaturation in the hydrocarbon molecule where the hydrogen chloride is split off. This reaction usually is carried out in the presence of solid contact materials, e. g., lime, clay, and the like, some of which are hydrogen chloride acceptors and others are inert promoters.

It has now been discovered that this process may be carried out more efficiently as evidenced by decreased reaction time and temperature, and by olefin products having higher iodine value and lower residual halogen content. These improvements have been accomplished by specially pretreating siliceous base contact materials to provide the desired activated catalysts for the reaction. This pretreatment comprises subjecting the siliceous base contact material to a hydrocarbon oil under conversion conditions such as catalytic cracking and then burning out the carbonaceous residue deposited therein. Treatment under vapor phase conversion conditions is preferred to liquid phase treatment.

It is an object of this invention, therefore, to provide a process for the activation of siliceous-base content materials to produce a dehydrohalogenation catalyst.

Another object is to provide as a new composition of matter an improved catalyst for organic dehydrohalogenation reactions.

A further object is to provide an improved process of forming olefinic hydrocarbons by the catalytic dehydrohalogenation of halogenated high molecular weight paraffinic hydrocarbons.

Other objects of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Broadly stated, the invention comprises activating a siliceous-base contact material by treating it with a hydrocarbon oil under catalytic conversion conditions and then burning out the carbonaceous deposit therefrom. The resulting activated catalyst is then mixed with the halogenated high molecular weight paraffinic hydrocarbon. The mixture is heated over a period of several hours and the resulting olefinic material is separated from the catalyst.

The paraffinic materials employed are those having from about twelve to thirty carbon atoms in the molecule and more usually the higher paraffins and waxes having from eighteen to twenty-four carbon atoms. Although these hydrocarbons are usually halogenated with chlorine, it will be readily apparent that other halogenated hydrocarbons such as brominated and iodinated compounds are included within the scope of this invention. A typical product to be treated with the activated catalyst in the process of this invention consists of a mixture of mono-, di-, and poly-chlorinated aliphatics in which the molecular distribution of chlorine averages from about one to two atoms per mole. Specific examples include chlorinated octadecane, chlorinated waxes, and the like. One such material consists of a parffin wax of about 24 carbon atoms which has been chlorinated to contain about 16 per cent chlorine by weight, corresponding to approximately 1.8 atoms of chlorine per mole.

The dehydrohalogenation may be carried out by mixing the halogenated paraffin with from about 5 to 15 per cent of its weight of the activated catalyst and heating gently below about 212° F. for a time sufficient to remove from the catalyst adsorbed gases and water sometimes present which upon release cause foaming of the organic material. The temperature of the mixture is then gradually raised over a period of from two to five hours to a temperature in the range from about 450 to 550° F. The mass is then held at this temperature for an additional half hour to two hours. The unsaturated material is then separated from the catalyst. The dehydrohalogenation is preferably carried out under a blanket of an inert gas such as natural gas, nitrogen, and the like. Although a catalyst range of from about 4 to 26 weight per cent has been used, concentrations of from about 7 to 10 per cent have been found to be most effective.

The catalyst used may be any natural or synthetic siliceous base material of the alumino-silicate and magnesium silicate types conventionally used as contact material in hydrocarbon conversion reactions such as, for example, kaolin, bentonite, pyrophyllite, talc, and the like. A typical naturally occurring material is a montmorillonite type clay composed of aluminum silicate with varying minor constituents which has been acid treated to produce a cracking catalyst. Many synthetic silica/alumina type catalysts which are on the market for use in catalytic cracking and other hydrocarbon conversion processes may be used. These may also contain minor amounts of magnesium oxide, zirconium oxide, beryllium oxide, and the like. Such contact materials may initially be in the form of beads, particles, or compressed pellets and in any of such forms may be activated for my purposes. I have found that to be most effective in dehydrohalogenation, the activated material should be about 100 mesh or finer in particle size.

The conditions under which the siliceous-base contact material is treated with hydrocarbon oil in the activation process include a temperature in the range of about 700 to 1100° F., a space velocity of about 0.5 to 10 liquid volumes of oil to each volume of contact material per hour and a treatment period of from about 5 to 30 minutes. A preferred temperature range is 900 to 1000° F. with a preferred space velocity of from 0.5 to 5. The carbonaceous deposit which is formed in the contact material during the oil treatment is burned off with air or other combustion supporting gas at a temperature of from about 1050 to 1300° F. Care must be taken during this step that the temperature does not exceed about 1300° F. so as to avoid occurrence of any appreciable sintering. A preferred temperature for burning off the carbonaceous deposit lies between 1150 and 1250° F. The oil treatment of the contact material may be carried out in either a fixed bed or fluidized operation. Among the hydrocarbons which may be used in the activation are various petroleum fractions such as gas oil, naphtha, cycle oils, topped crude, and the like. Because the conditions of the activating pretreatment correspond generally to those in the catalytic crackers in widespread use in petroleum refining, the catalyst discard such as fines from such crackers provide a convenient source for activated catalyst for dehydrohalogenation.

It has been suggested in the prior art that the activity of silica/alumina catalysts for dehydrohalogenation may be enhanced by sintering at temperatures of the order of 2000° F. I have made comparative tests, however, and find that this is not borne out. In fact, while simple non-sintering heating improves slightly the efficiency of the contact material over the untreated form, sintered contact material showed poorer results. In each of the examples shown in the table below, a Filtrol catalyst (an acid treated montmorillonite clay) of particle size about 100 mesh was used to dehydrochlorinate a polychlorowax containing 15.4 weight per cent chlorine. In each of the runs 400 grams of polychlorowax were mixed with 40 grams of the contact material at room temperature. This mixture was heated up to 482° F. over a period of two hours and was then held at this temperature for one hour more. The reaction mass was blanketed with an inert atmosphere of natural gas throughout the run. After the hour's heating at 482° F., the mass was cooled to 302° F. and was filtered through diatomaceous earth to remove contact material. The filtrate is the wax olefin product having properties as shown in the table. The results are as follows:

| Treatment of Contact Material | Iodine Value (Theoretical 131) | Residual Chlorine (Percent) | Color |
|---|---|---|---|
| 1. No treatment | 73.0 | 0.05 | Light. |
| 2. Heat treated at 1,220° F. for: | | | |
|    a. 2 hours | 83.0 | 0.50 | Light. |
|    b. 17 hours | 82.6 | 0.62 | Light. |
| 3. Sintered at 1,770° F. for 2 hours | 63.6 | 8.18 | Black. |
| 4. Treated according to this invention with deposits burned off at about 1,200° F | 95.2 | 0.55 | Medium. |

It is apparent from above Example 4 that the activating treatment of this invention has a pronounced effect in producing the desired catalyst and that this effect does not result from heating alone as in Example 2. It is not known what subtle changes occur during the activating treatment which produces a catalyst particularly effective for the dehydrohalogenation reaction. While applicant does not wish to be bound by any particular theory, it is possible that the adherence of minute bits of carbon remaining on the surface of the catalyst particles after removal of the deposits results in the improved dehydrohalogenation. Using the dehydrohalogenation catalysts produced according to this invention, light colored olefins having iodine values of as high as 121 and residual chlorine content as low as 0.16 per cent have been obtained.

The following specific example is illustrative of the procedures of this invention.

The catalyst is first activated as follows: A batch of finely divided commercially available acid treated montmorillonite clay is heated to a temperature of 973° F. and fed in a stream through a reactor tube. At the same time a stream of virgin gas oil, boiling range of 400 to 850° F. is vaporized in a heater, bringing the temperature of the vaporized oil to 900° F. and the heated oil vapor is passed through the stream of siliceous solids in the reactor tube. The solids to oil ratio (i. e. volume of solids/volume of oil/hour) is 2.3 and a space velocity (liquid volume oil/volume solids/hour) of 2.75 is maintained. Thus the contact time between the hydrocarbon oil and the contact material represented by the reciprocal of the product of space velocity times the solids-to-oil ratio is 11.2 minutes. The siliceous solids separated from oil conversion products pass from the reactor at a temperature of 890° F. Immediately upon withdrawal from the reactor, the oil treated siliceous solids are stripped with steam to reduce volatile matter in the carbonaceous deposit thereon, thus also reducing the temperature of the contact material to 825° F. At this time the siliceous base material undergoing activation was found to contain a carbonaceous deposit amounting to about 2 to 2.5 per cent carbon based on the weight of the siliceous solids. This deposit is then removed by combustion at 1150 to 1200° F. At least about 90 per cent of the carbonaceous deposit is removed in this manner to produce the desired catalyst which may contain a residual quantity of carbon not exceeding about 0.1 to 0.3 per cent by weight of the catalyst.

The catalyst produced as described above was then used in a dehydrochlorination process as follows: A charge of 400 grams of polychlorowax of 15.0 per cent chlorine was placed in a three-necked flask equipped with a thermometer, a mechanical stirrer, and a methane inlet tube. After the flow of methane was started, the chlorowax was stirred while being heated to 212° F. At this point, 40 grams of the activated catalyst was charged to the reactor. Objectionable foaming occurs if the catalyst is added at a higher temperature. The temperature was then slowly raised to 482° F. during the course of about 4 hours. Heating was then continued at this temperature for one additional hour. The blanket of neutral gas was maintained throughout the reaction period. The mixture was then cooled to 302° F. and filtered through diatomaceous earth to separate the catalyst. The resulting wax olefin filtrate was light in color, had a high iodine number, and low residual chlorine.

It is apparent that many modifications and variations of the invention as hereinbefore set forth may be made without departing from the spirit and scope thereof. The examples given are by way of illustrating the invention which is limited only by the terms of the appended claims.

I claim:

1. In a process of catalytic dehydrohalogenation in which a halogenated high molecular weight paraffinic hydrocarbon is heated at a moderately elevated temperature in the presence of a siliceous base contact material to drive off a hydrogen halide gas and produce an olefinic hydrocarbon, the improvement which resides in activating the contact material by a pretreatment which comprises treating the contact material with a hydrocarbon oil under hydrocarbon conversion conditions at a temperature of about 700 to 1100° F., at a space velocity of about 0.5 to 10 liquid volumes of oil to each volume of contact material per hour for a period of from about 5 to 30 minutes and then removing carbonaceous deposits from the contact material by combustion at a temperature of about 1050 to 1300° F.

2. In a process of catalytic dehydrohalogenation in which a halogenated high molecular weight paraffinic hydrocarbon is heated at a moderately elevated temperature in the presence of a siliceous base contact material to drive off a hydrogen halide gas and produce an olefinic hydrocarbon, the improvement which resides in activating the finely divided siliceous contact material by a pretreatment which comprises treating the contact material with a hydrocarbon oil under vapor phase hydrocarbon conversion conditions at a temperature of about 900 to 1000° F., at a space velocity of about 0.5 to 5 liquid volumes of oil to each volume of contact material per hour for a period of about 5 to 30 minutes and then burning the carbonaceous deposits from the contact material at a temperature of about 1150 to 1250° F.

3. In a process of catalytic dehydrochlorination in which a chlorinated high molecular weight paraffinic hydrocarbon is heated at a moderately elevated temperature in the presence of a siliceous base catalyst to drive off hydrogen chloride gas and produce an olefinic hydrocarbon, the improvement which resides in activating the finely divided siliceous contact material by a pretreatment which comprises vapor phase treating the contact material with a hydrocarbon oil under cracking conditions at a temperature of about 900 to 1000° F., at a space velocity of about 0.5 to 5 liquid volumes of oil to each volume of contact material per hour for a period of about 5 to 30 minutes and then burning the carbonaceous deposits from the contact material at a temperature of about 1150 to 1250° F.

4. An improved process of catalytically dehydrohalogenating a halogenated high molecular weight paraffinic hydrocarbon which comprises the steps of pretreating finely divided siliceous base contact material to activate the same by treating the contact material with a hydrocarbon oil under vapor phase hydrocarbon conversion conditions at a temperature of about 700 to 1100° F., at a space velocity of about 0.5 to 10 liquid volumes of oil to each volume of contact material per hour for a period of from about 5 to 30 minutes and then burning off carbonaceous deposits from the contact material at a temperature of 1050 to 1300° F., adding the thus activated contact material to an amount of a halogenated high molecular weight paraffinic hydrocarbon in the proportions of about 5 to 15 per cent by weight of the activated contact material at a temperature below about 210° F., slowly raising the temperature of the reaction mass to 450–550° F. over a period of from about two to five hours, holding the mass at this temperature for from one-half to two hours additionally and separating the contact material from the olefinic product thus produced.

5. An improved process of catalytically dehydrohalogenating a halogenated high molecular weight paraffinic hydrocarbon which comprises the steps of pretreating finely divided siliceous base contact material to activate the same by treating the contact material with a hydrocarbon oil under vapor phase hydrocarbon conversion conditions at a temperature of about 700 to 1100° F., at a space velocity of about 0.5 to 10 liquid volumes of oil to each volume of contact material per hour for a period of from about 5 to 30 minutes and then burning off carbonaceous deposits from the contact material at a temperature of 1050 to 1300° F., adding the thus activated contact material to an amount of a halogenated high molecular weight paraffinic hydrocarbon in the proportions of about 5 to 15 per cent by weight of the activated contact material at a temperature below about 210° F., slowly raising the temperature of the reaction mass to 450–550° F. over a period of from about two to five hours, holding the mass at this temperature for from one-half to two hours additionally, maintaining during the reaction an inert atmosphere above said contact material and said halogenated high molecular weight hydrocarbon and separating the contact material from the olefinic product thus produced.

References Cited in the file of this patent
UNITED STATES PATENTS

| | | |
|---|---|---|
| 2,078,247 | Houdry | Apr. 27, 1937 |
| 2,467,123 | Fleck et al. | Apr. 12, 1949 |